Aug. 7, 1928.  
S. EINSTEIN ET AL  
1,679,413  
CUTTER GRINDER  
Filed March 14, 1924   4 Sheets-Sheet 4
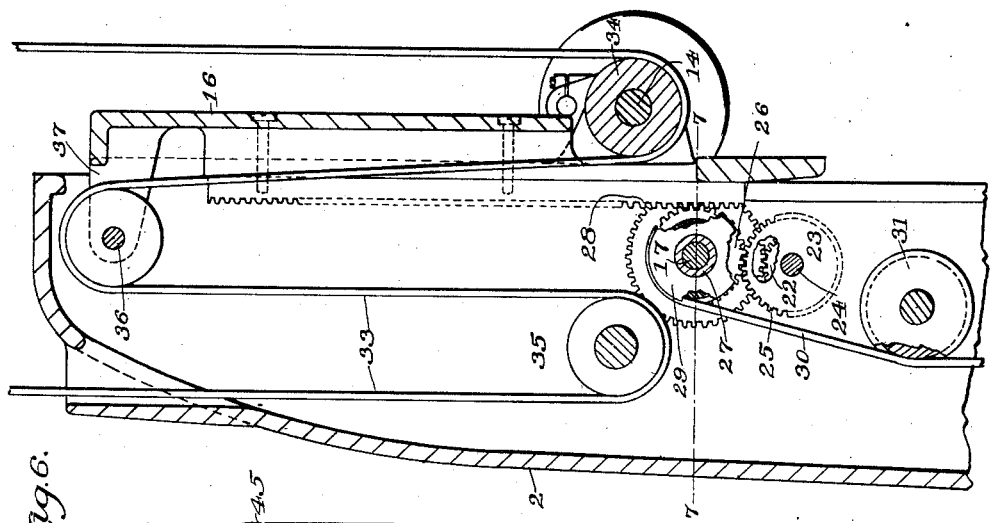
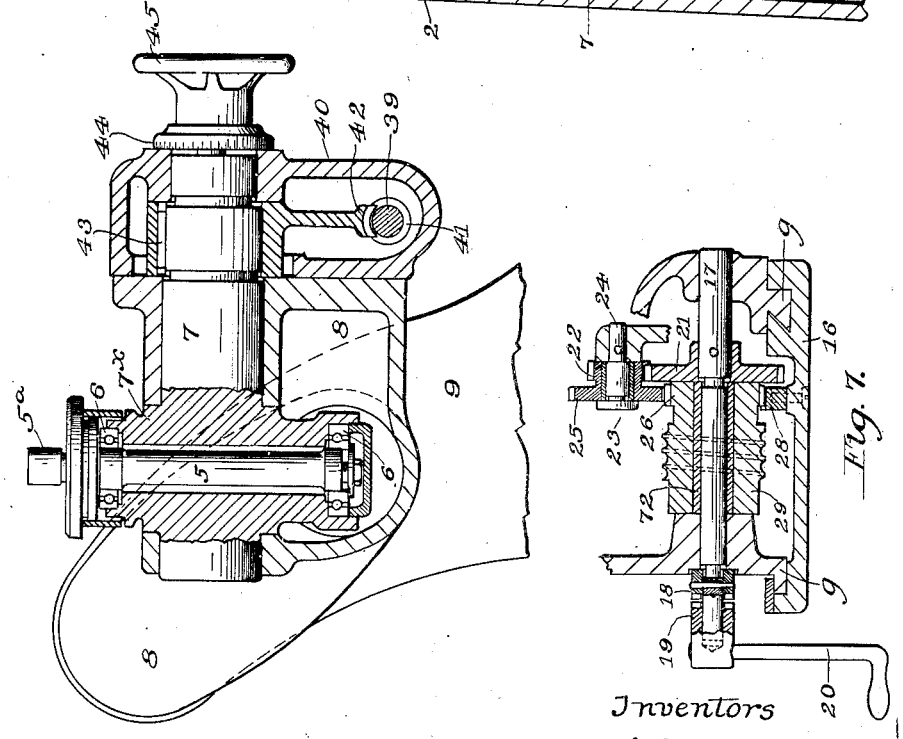
Inventors  
Sol Einstein  
Lester F. Nenninger  
Herman R. Osler  
By Attorney  
Albert F. Nathan Patented Aug. 7, 1928.

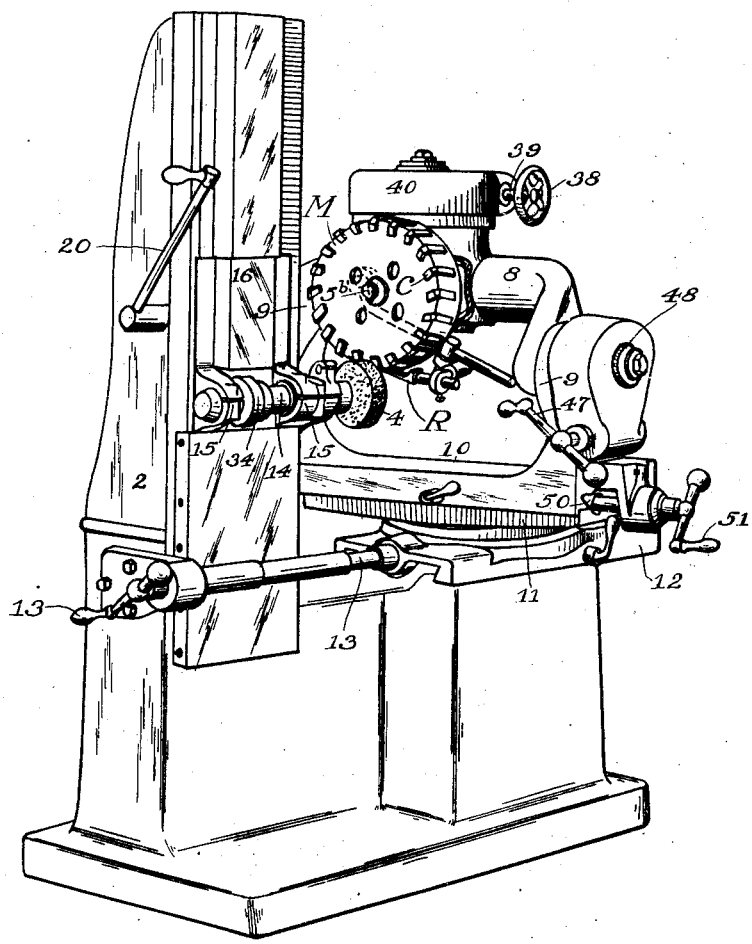

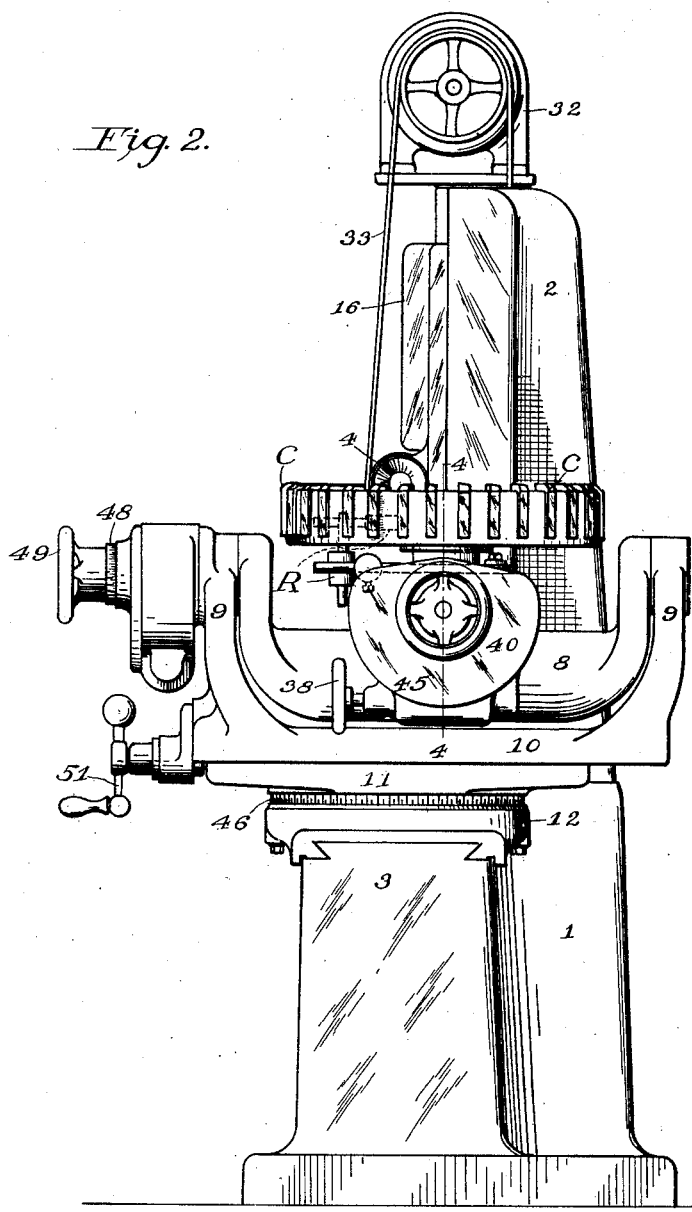

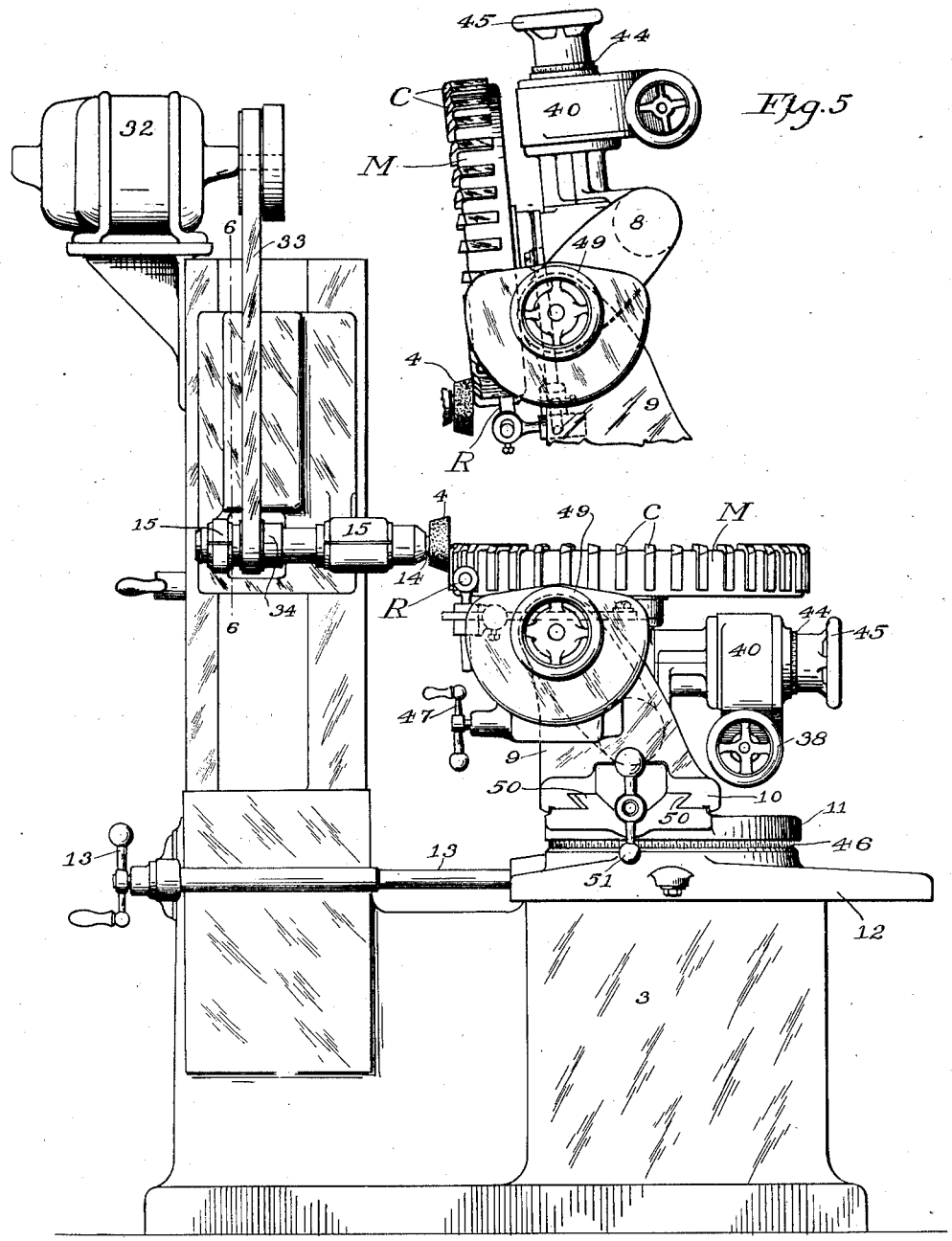

1,679,413

UNITED STATES PATENT OFFICE.

SOL EINSTEIN AND LESTER F. NENNINGER, OF CINCINNATI, AND HERMAN R. ISLER, OF NORWOOD, OHIO, ASSIGNORS TO THE CINCINNATI MILLING MACHINE COMPANY, OF OAKLEY, CINCINNATI, OHIO, A CORPORATION OF OHIO.

CUTTER GRINDER.

Application filed March 14, 1924. Serial No. 699,230.

This invention relates to grinding machines and particularly to grinding machines adapted to grind or sharpen cutting tools of large proportions, such as for example "face mills" for milling machines.

Cutting tools of this character are commonly provided with a series of cutters or teeth each of which is formed with a peripheral surface and a side surface each terminating in a cutting edge, and a corner or intermediate cutting portion connecting the side and peripheral edges. This corner portion is, on large mills, usually formed of a plurality of connected, yet distinct, cutting edges which together approximate a curve.

A convenient way of sharpening the teeth of a cutter of this character is to successively support the mill in a plurality of positions to bring the various surfaces affording the cutting edges separately to the action of a rotating grinding wheel and in these positions, by a relative translation between the cutter and the grinding wheel, to cause the wheel to act upon the entire surface.

As is well understood by those skilled in the art the various surfaces of the cutters must be presented to the grinding machine in such positions that they will be ground with definite and predetermined rake and clearance angles and this invention deals particularly with means for easily and conveniently effecting such presentation.

In certain types of face mills the teeth are inserted in the cutter-head parallel with the axis of the latter, while in others they are arranged oblique to the axis thereof. It has been found that a finer and smoother cutting edge is secured and that the life of a cutter is materially increased when the cutter is ground perpendicular to its cutting edge and in order so to grind the cutters when they are arranged oblique to the axis of the cutter-head it is necessary to present each cutter to the grinding wheel not only with respect to the rake and clearance angles and also with respect to its oblique positioning as will hereinafter be more fully explained.

In the sharpening of face mills the following problems are encountered (1st) the chucking or securing of the mill to a suitable support, (2nd) the setting of the cutters at the various angles with respect to the grinding wheel, (3rd) the indexing of the mill-head from one tooth to the next, (4th) the mounting of a suitable tooth-rest and (5th) the relative bodily movement between the work and the grinding wheel.

This invention has for an object to provide a grinding machine in which the component parts are so constructed and arranged that all of the cutting edges of all of the cutters of a face mill may be accurately and conveniently ground at a single chucking of the mill on the grinding machine.

A further object of the invention is to provide a grinding machine with a millhead support by means of which the millhead may be adjusted in both vertical and horizontal planes and rotated about its axis to bring the various surfaces to the action of the grinding wheel.

Another object is to combine in a grinding machine a universally adjustable support for a face mill and a rotatable grinding wheel and to provide means for effecting a relative bodily movement between the cutters and the grinding wheel whereby the grinding wheel is caused to act upon the entire faces of all of the cutters in a single chucking of the mill on the grinding machine.

A still further object of the invention is to provide a universally adjustable cutter-support and to combine therewith a tooth-rest adapted to cooperate with the cutter teeth in all of the adjusted positions of the cutter-head.

Still another object of this invention is to provide positively acting means for adjusting in any desired direction, the various parts of a face mill support and to provide suitable graduations to accurately indicate the extent of adjustment effected in any direction.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 is a perspective view of a grinding machine embodying the present invention. Fig. 2 is an end view of the machine shown in Fig. 1. Fig. 3 is a side view thereof. Fig. 4 is an enlarged section on the line 4—4 of Fig. 2 with the face mill omitted. Fig. 5 is a detail showing the work support adjusted to an upright position to bring the face portions of the cutters to the action of the grinding wheel. Fig. 6 is a section on the line 6—6 of Fig. 3 showing the means for adjusting the grinding wheel support vertically on the stanchion and the means for rotating the grinding wheel. Fig. 7 is a horizontal section on the line 7—7 of Fig. 6.

Referring more particularly to the drawings the invention is disclosed in its preferred form as embodied in a grinding machine comprising a frame 1 formed with an upstanding stanchion 2 and a knee 3. The stanchion preferably carries the grinding wheel 4 and the means for rotating it, and the knee sustains the work-support and the means for moving the latter in a plurality of directions.

The face mill M, carrying the cutters or teeth C to be ground, is preferably removably secured upon a spindle 5 rotatably journaled as by means of anti-friction bearings 6, in an arbor 7. This arbor is journaled in a cradle 8 which is suspended between upstanding arms 9 forming a part of a table 10, slidably mounted in a turret 11. The turret is supported upon a bed 12 slidingly fitted to the knee 3 and is adapted to be moved horizontally toward and from the stanchion by means of a manually controlled shifting mechanism designated generally as 13.

To provide a relative bodily movement between the cutters and the grinding wheel (which latter is preferably of the cupped type) whereby the wheel is caused to act upon the entire faces to be ground, the grinding wheel may conveniently be secured upon a shaft 14 journaled in bearings 15 provided by a slide 16 adjustably mounted on guides $g$ upon the stanchion 2. Vertical movement of the slide 16 and the grinding wheel may conveniently be effected in the following manner. Within the stanchion is journaled a shaft 17 to which is secured a clutch member 18 adapted to be engaged by a similar clutch-member 19 loosely journaled upon the shaft and to which is secured an actuating crank 20. The shaft 17 has secured to it a gear 21 which meshes with a gear 22, forming a part of a gear-unit 23 loosely journaled on a short shaft 24 also carried by the stanchion 2. The unit 23 provides a gear 25 which meshes with and drives a gear 26 loosely journaled on a bushing 27 surrounding the shaft 17. The gear 26 also meshes with the teeth of a rack 28 secured to the slide 16 and thus, by rotation of the crank 20 the slide, and the grinding wheel carried thereby, may be translated on the stanchion. Integral with the gear 26 is a drum 29 to which is secured one end of a cable 30 which passes downwardly therefrom over an idler 31 and has attached to its lower end a suitable weight (not shown) adapted to act as a counter-balance for the slide 16. The drum 29 is preferably provided with a spiral groove which guides the cable laterally as the drum is rotated, thereby preventing overlapping of the coils.

A convenient means for rotating the grinding wheel in all of the adjusted positions of the slide 16 on the stanchion consists in mounting upon the upper end of the stanchion a motor 32 connected by a belt 33 with a pulley 34 on the shaft 14. The belt is preferably arranged to pass around a fixed pulley 35 journaled in the stanchion and around an idler pulley 36 journaled upon an extension 37 formed upon the slide 16. With this arrangement the pulley 36 gives up slack as the slide 16 and the pulley 34 are moved downwardly away from the motor, and takes up the slack produced by the upward movement of the slide, thereby maintaining the belt taut in all of the positions of the slide.

An adjustable tooth rest R is secured to the transverse portion $7^x$ of the arbor 7 and when once set for one cutter of any particular mill-head requires no further adjustment inasmuch as it is moved to all of the angular positions to which the mill-head is adjusted.

Presupposing that a face mill of the oblique tooth type is to be ground, the operation of the machine is as follows: With the spindle 5 in a vertical position and with all dials set at zero, the face mill is placed on the upper end $5^a$ of the spindle 5. The mill is then tipped to an angle equal to the angle the tooth is located with respect to the axis of the mill (usually about 7 degrees) to bring the tooth in a vertical position. This adjustment is effected by means of a hand-wheel 38 secured to a shaft 39 journaled in a sub-casing 40 carried by the cradle. To the shaft 39 is secured a worm 41 which actuates a segmental worm-wheel 42 secured as by means of a key 43 to the arbor 7. The extent of rotation of the arbor may be indicated by a graduated dial 44 fixed to the arbor, and when the desired angular position of the mill-head has been secured the arbor may be locked against further movement by a clamping wheel 45. Next the mill is rotated on the spindle 5 to bring the forward edge of the face portions of one of the teeth to a position perpendicular to the grinding face of the grinding wheel. This may be done by placing one blade of a steel square against the face of the grinding wheel and bringing the tooth into contact with the other blade thereof. In this position the cutter is fixed to the spindle by tightening the clamping bolt 5ᵇ. With the mill-head in this position the tooth-rest is adjusted to engage the forward face of the tooth adjacent the grinding wheel and after being secured in that position the tooth-rest requires no further adjustment for that mill as it moves with and maintains its relative position with the mill in all of the subsequent adjustments of the latter.

These teeth are usually set in the mill head at an angle of about ten to fifteen degrees to a radial line to produce an effective rake or undercut and are ground with a peripheral clearance which may be in the neighborhood of ten degrees, more or less dependent upon the nature of the work to be milled. Thus to present the peripheral cutting face of a tooth to the grinding wheel at the proper angle after the mill has been secured with the tooth perpendicular to the face of the grinding wheel, it is necessary to rotate the mill with respect to the cutter an amount equal to the rake angle plus the clearance angle. In the present machine this is effected by rotating the turret 11 on the bed 12, the degree of rotation being determined by the graduations 46. The peripheral face being set at the proper angle, the bed 12 and all the parts carried thereby including the mill-head are moved horizontally toward the grinding wheel to bring the tooth into contact therewith. The grinding wheel is then moved vertically to cause it to act upon the entire surface of the tooth as hereinbefore described. The mill is then rotated step-by-step to successively bring the teeth to the action of the grinding wheel.

In certain cutters it is desirable to form the periphery of the blades of two distinct surfaces. Of these, the surface adjacent the cutting edge is known as the "land" and is preferably narrow and is at a relatively slight angle to a radial line while the other surface extending from the land to the heel of the cutter is wider and is ground off at a substantially greater angle to a radial line. After the lands have been ground, as just described, the turret may be given a further rotation and the heel clearance ground in a similar manner.

The peripheral surfaces having been ground, the bed 12 and thereby the mill-head is backed off from the grinding wheel and, by rotation of the handle 47 (which actuates a suitable worm and worm-wheel, not shown) the cradle is swung upwardly to present the corner of the teeth to the grinding wheel. These corners are each preferably sharpened in three grindings which produce three distinct cutting surfaces approximating a curve. These surfaces may conveniently be at the angles of 22½°, 45° and 67½° to the peripheral cutting-edges. The angular position of the cradle may be determined by a graduated dial 48 carried by one of the trunnions of the cradle. When the cradle has been swung upwardly to the desired angle it may be locked against displacement by rotation of a clamping hand-wheel 49.

After the corner surfaces have been ground the cradle and the mill-head may be tipped further to the position shown in Fig. 5, and the side faces of the teeth ground with the usual clearance angle.

In a mill-head in which the teeth are arranged parallel with the axis of the head the teeth are ground the same as hereinbefore described except that the initial tipping of the mill-head is not required and is therefore omitted, the teeth already being in a vertical position.

In the grinding of certain cutters it is desirable to have the axis of the mill-head intersect the axis of the grinding wheel, while in the grinding of other cutters the axis of the mill is preferably located at one side of the axis of the grinding wheel. To meet these requirements the table 10 is slidably mounted on guides 50 on the turret 11 and may be adjusted back and forth thereon by means of a suitable screw actuated by a hand-crank 51.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. A grinding machine combining a frame; a grinding wheel rotatably and translatably journaled thereon; means to rotate the grinding wheel; means to support a cutter adjacent said grinding wheel and to give to said cutter six different adjustments relative to said grinding wheel to present to said grinding wheel adjacent faces of said cutter disposed at an angle of more than ninety degrees; and means to give to said grinding wheel bodily movements to cause it to traverse said faces.

2. A grinding machine combining a frame providing a stanchion and a knee; a grinding wheel carried by said stanchion; means for rotating said grinding wheel; a universally adjustable work-support carried by said knee; a work-carrying spindle mounted on said support; means on said work-support for rotating said spindle thru an angle of at least ninety degrees about an axis transverse to the axis of said spindle; and means for effecting a bodily movement of said grinding wheel in a vertical plane to cause said grinding wheel to traverse the work secured upon the work spindle.

3. A cutter grinding machine combining a frame provided with a stanchion; a work support; a slide translatably mounted upon said stanchion; a grinding wheel rotatably journaled on said slide; a rack bar connected to said slide; a pinion rotatably journaled in said stanchion and meshing with said rack; means to rotate said pinion to cause translation of said slide; a counterweight for said slide operatively connected to said pinion and tending to rotate it in a direction opposite to the direction it is urged by the weight of said slide rack.

4. A cutter grinding machine combining a frame comprising a stanchion and a knee; a cutter holding spindle universally supported upon said knee; a tool-slide translatably mounted on said stanchion; a grinding wheel rotatably supported by said slide; a rack secured to said tool-slide; a shaft journaled in said stanchion; a drum loosely journaled co-axial with said shaft; a pinion rotatable with said drum and meshing with said rack; a multiple gear connection between said shaft and said pinion; means to rotate said shaft, gear connection and pinion to effect translation of said tool-slide; a counterweight for said tool-slide; and a flexible connector attached to said counterweight and adapted in the downward movement of said slide to be wound upon said drum.

5. A cutter grinding machine combining a frame providing a stanchion; a work-support; a slide translatably mounted upon said stanchion; a grinding wheel rotatably journaled on said slide; a rack carried by said slide; a shaft journaled in said stanchion; a gear coaxial with said shaft and meshing with said rack; a counter-balance for said slide including a counter-weight, a cable attached thereto; a drum upon which the cable is adapted to be wound; and means for simultaneously rotating said gear and drum to move said slide and counter-weight in opposite directions.

6. A grinding machine combining a grinding wheel; means for rotating the grinding wheel; means for moving said grinding wheel vertically in opposite directions; a work-support; means for adjusting said work-support bodily toward and from said grinding wheel; means permitting said work-support to be swung in a horizontal plane; and means independent of said first-mentioned adjustments for universally adjusting the work carried by said work-support successively to bring to the action of said grinding wheel surfaces arranged at least ninety degrees to each other.

7. A cutter grinding machine combining a grinding wheel; means for rotating the grinding wheel; a universally adjustable cutter-support including a cradle; means for supporting said cradle; means for adjusting said cradle about a horizontal axis; an arbor journaled in said cradle transverse to said horizontal axis; means for adjusting said arbor about its longitudinal axis in said cradle; means cooperating therewith to lock said arbor in its adjusted position against turning in said cradle; a work-supporting spindle rotatably journaled in said arbor; and means for securing a cutter head on said spindle.

8. A cutter grinding machine combining a single grinding wheel; means for rotating the grinding wheel; a cutter-support including a cradle; means for adjustably supporting said cradle upon a horizontal axis; an arbor journaled in said cradle transverse to the axis of the cradle; a cutter-supporting spindle journaled in said arbor transverse to the axis of the cradle and to said arbor; and means for swinging said cradle ninety degrees about its axis and for partially rotating said arbor to give said cutter any one of a plurality of angular positions with respect to said grinding wheels in both vertical and horizontal planes to permit grinding of side and face portions of the cutters of end mills by said single grinding wheel.

9. A cutter grinding machine combining a grinding wheel; means for rotating the grinding wheel; a cutter-support including a cradle; means for adjustably supporting said cradle upon a horizontal axis; an arbor journaled in said cradle transverse to the axis of the cradle; a cutter-supporting spindle journaled in said arbor transverse to the axis of the cradle and to said arbor; means for swinging said cradle about its axis more than ninety degrees and for partially rotating said arbor to give said cutter any one of a plurality of angular positions with respect to said grinding wheel; and an adjustable tooth-rest carried by said cradle and cooperating with the teeth of said cutter in all of the adjusted positions of the latter.

10. A cutter grinding machine combining a frame providing a stanchion and a knee; a grinding wheel carried by said stanchion; means for rotating said grinding wheel; a bed slidably supported upon said knee; means for moving said bed on said knee toward and from said stanchion; a turret mounted on said bed; a table slidably mounted on said turret and provided with upstanding arms; a cradle suspended between said arms; an arbor journaled in said cradle; a cutter-supporting spindle rotatably journaled in said arbor; a sub-casing carried by said cradle; a shaft journaled in said sub-casing; a worm secured to said shaft; a segmental worm-wheel secured to said arbor and engaging said worm; manually controlled means for rotating said worm to cause it to partially rotate said arbor; and means for indicating the extent of rotation of the arbor.

11. In a grinding machine for cutters having peripheral, corner and face cutting edges, said peripheral and face cutting edges being arranged at an angle of at least ninety degrees, a grinding wheel and means for rotating it; a work-support; means for supporting a cutter on said work-support; means for adjusting said work-support to bring one of said cutting edges into contact with said grinding wheel; and means for further adjusting said work-support to successively bring each of the other cutting edges into contact with the grinding wheel without removing the cutter from said work-support.

In witness whereof, we have hereunto subscribed our names.

SOL EINSTEIN.
LESTER F. NENNINGER.
HERMAN R. ISLER.